United States Patent
White et al.

(10) Patent No.: US 10,962,283 B2
(45) Date of Patent: Mar. 30, 2021

(54) HELIUM EXTRACTION FROM NATURAL GAS

(71) Applicant: Air Products and Chemicals, Inc., Allentown, PA (US)

(72) Inventors: Vincent White, Surrey (GB); Paul Higginbotham, Surrey (GB); Jason Michael Ploeger, Perkasie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 142 days.

(21) Appl. No.: 16/130,260

(22) Filed: Sep. 13, 2018

(65) Prior Publication Data

US 2020/0088466 A1    Mar. 19, 2020

(51) Int. Cl.
*F25J 3/06* (2006.01)
*F25J 3/08* (2006.01)
*B01D 53/22* (2006.01)

(52) U.S. Cl.
CPC ............ *F25J 3/069* (2013.01); *B01D 53/226* (2013.01); *B01D 53/227* (2013.01); *B01D 53/229* (2013.01); *F25J 3/08* (2013.01); *F25J 2200/06* (2013.01); *F25J 2200/38* (2013.01); *F25J 2200/40* (2013.01); *F25J 2205/64* (2013.01); *F25J 2205/80* (2013.01); *F25J 2205/82* (2013.01); *F25J 2215/30* (2013.01); *F25J 2220/62* (2013.01); *F25J 2220/66* (2013.01); *F25J 2220/68* (2013.01); *F25J 2260/60* (2013.01); *F25J 2270/30* (2013.01); *F25J 2280/10* (2013.01)

(58) Field of Classification Search
CPC .. F25J 3/029; F25J 3/0685; F25J 3/069; F25J 2215/30; F25J 2205/60
See application file for complete search history.

(56) References Cited

U.S. PATENT DOCUMENTS

| 3,324,626 | A | * | 6/1967 | Yarbrough | ............... F25J 3/08 95/39 |
| 3,599,438 | A | | 8/1971 | Blackwell et al. | |
| 4,758,258 | A | | 7/1988 | Mitchell et al. | |
| 5,011,521 | A | | 4/1991 | Gottier | |
| 5,017,204 | A | | 5/1991 | Gottier et al. | |

(Continued)

FOREIGN PATENT DOCUMENTS

| DE | 102012000147 | 7/2013 |
| WO | 2016012811 | 1/2016 |
| WO | 2017020919 | 2/2017 |

OTHER PUBLICATIONS

Sanders, et al, "Polymer", vol. 54, 4729-4761, 2013.
Kirk-Othmer Encyclopedia of Chemical Technology, "Cryogenic technology", 1-29, 2012.

*Primary Examiner* — Brian M King
(74) *Attorney, Agent, or Firm* — Amy Carr-Trexler

(57) ABSTRACT

A helium-containing stream is recovered from a natural gas feed using a membrane followed by multiple distillation steps. Refrigeration is provided by expanding a bottoms liquid with a higher nitrogen content than the feed, achieving a lower temperature in the process. The helium-enriched vapor is then purified and the helium-containing waste stream is recycled to maximize recovery and reduce the number of compressors needed. The helium-depleted natural gas stream can be returned at pressure for utilization or transportation.

10 Claims, 1 Drawing Sheet

(56) References Cited

U.S. PATENT DOCUMENTS

| | | | |
|---|---|---|---|
| 5,167,125 A | 12/1992 | Agrawal | |
| 8,911,535 B2 | 12/2014 | Kulkarni et al. | |
| 2008/0196587 A1 | 8/2008 | Ha | |
| 2009/0013718 A1 | 1/2009 | Schmidt | |
| 2011/0174017 A1* | 7/2011 | Victory | F25J 3/0233 |
| | | | 62/620 |
| 2012/0111051 A1* | 5/2012 | Kulkarni | F25J 3/069 |
| | | | 62/619 |
| 2013/0255311 A1 | 10/2013 | Thiebault et al. | |
| 2014/0137599 A1* | 5/2014 | Oelfke | F25J 3/069 |
| | | | 62/619 |
| 2014/0260417 A1* | 9/2014 | Herzog | F25J 3/0233 |
| | | | 62/611 |
| 2016/0231051 A1* | 8/2016 | Shah | C01B 3/501 |
| 2017/0176099 A1* | 6/2017 | Gaskin | F25J 3/0295 |

* cited by examiner

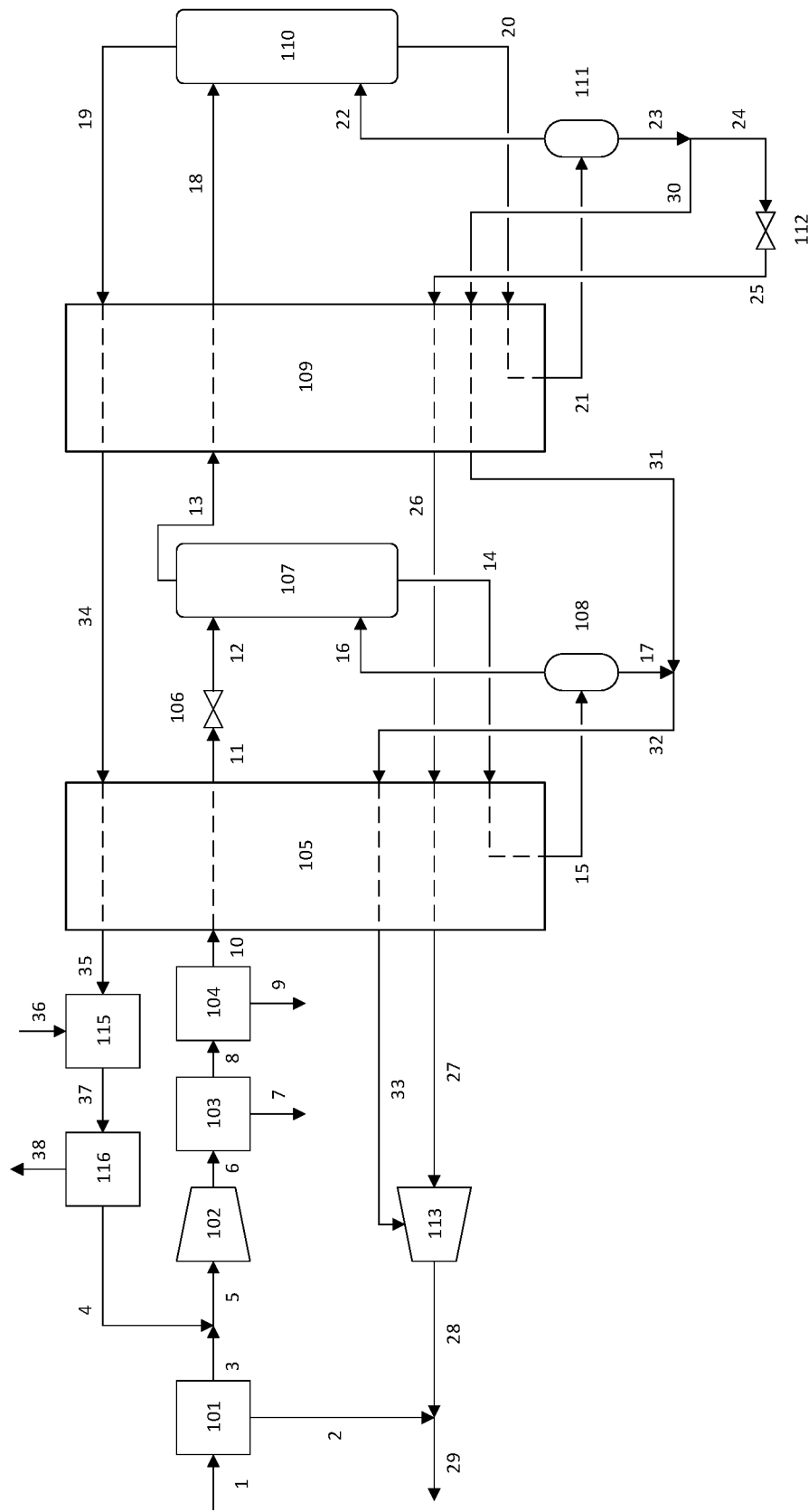

HELIUM EXTRACTION FROM NATURAL GAS

BACKGROUND

The present invention relates to processes and apparatuses for the extraction of helium integrated with further helium purification. In particular, the invention relates to the separation of helium from a natural gas stream comprising methane, nitrogen, and helium using membranes and cryogenic distillation.

Helium exists in many natural gas deposits worldwide, but there is a growing interest in efficiently recovering helium from natural gas deposits with low concentrations of helium, e.g. below 2000 ppmv. All percentages, unless otherwise specified, are on a mole basis. Recovery of helium from natural gas at these low levels has long been considered uneconomical. Helium recovery from natural gas occurs normally as a by-product of liquefied natural gas (LNG) production or nitrogen rejection. In both cases methane is condensed and the lighter helium is easily recovered as a gas. The present invention relates to the case in which the natural gas stream does not require liquefaction or nitrogen rejection. In this case, the gas may still contain significant nitrogen, but not enough to prevent the natural gas from being used in a pipeline or gas turbine.

Helium extraction from natural gas using cryogenic distillation is known. Oeflke (US 2014/0137599) teaches a cryogenic cycle for helium extraction that in FIG. 4 shows a cryogenic column for extraction of helium followed by further refrigeration and concentration of helium in a flash vessel. Refrigeration is provided by expanding the bottoms of the first extraction column. The temperature this refrigerant can achieve is limited by the mole fraction of methane in the bottoms liquid: the higher the methane, the higher the temperature.

Integrating a membrane into a helium extraction process is also known. Voss (WO 2017/020919) teaches a membrane—adsorption hybrid cycle for helium extraction in which two stages of membrane extraction feed an adsorption system. The permeate from the first stage of membranes must typically be compressed to a high pressure to feed the second stage of membranes, which usually results in high overall power consumption. Furthermore, at large feed flow rates the adsorption system would typically require multiple trains.

Integrating a membrane with distillation at sub-ambient temperatures is taught by Kulkarni (U.S. Pat. No. 8,911,535) for the separation of carbon dioxide. The membrane concentrates $CO_2$ to the point that it can be partially condensed in a heat exchanger. FIG. 6 shows that the $CO_2$-lean overhead can be sent to a helium recovery unit prior to recycle to the membrane feed, described as a second distillation column.

Typically, a helium extraction process produces a crude helium stream containing 5-50% helium. This crude helium stream is then sent to a helium purifier using a combination of partial condensation and/or adsorption steps to generate a pure helium stream containing over 99% helium. Schmidt (US 2009/0013718) teaches the integration of helium extraction using a flash vessel with helium purification using pressure swing adsorption (PSA). The tail gas from the PSA is sent to a dedicated compressor so that it can be mixed with the feed to the heat exchanger in order to recover the helium in the PSA tail gas.

At large feed flow rates, cryogenic distillation technology requires multiple parallel trains, reducing the capital cost advantage distillation usually has at large scale over membranes. In addition, for low feed concentrations of helium, the separation of helium in the distillation column is challenging due to the very high ratio of liquid to vapor flow rates. There is a need for increasing the helium content of the feed stream in order to mitigate both disadvantages: by reducing the flow rate to the distillation column enough that only a single train is needed, and increasing the ratio of vapor to liquid flow rate in the column due to helium enrichment.

SUMMARY

The objective of the present invention is to extract and purify helium from a natural gas feed comprising methane, nitrogen, and helium, while maximizing helium recovery and minimizing overall power consumption.

The present invention is a process to extract helium from a natural gas stream. Helium is first concentrated by roughly an order of magnitude using a membrane system. The helium-enriched permeate is compressed, and after contaminants such as carbon dioxide and water are removed, the stream is partially condensed and fed to a first distillation column. The overhead of this first distillation column is partially condensed again and fed to a second distillation column at a lower temperature to generate a crude helium vapor. The lower temperature is achieved by reducing the pressure of the bottoms liquid from the second distillation column. The crude helium vapor is purified by pressure swing adsorption and the purified helium may be sold as a gas or liquefied.

An advantage of the process in accordance with the invention is the significantly reduced size of the cryogenic distillation section compared with an approach that would send the entire feed to the distillation column. Using a typical polymeric membrane allows the flow rate to the distillation column to be about an order of magnitude smaller, resulting in significant capital savings.

BRIEF DESCRIPTION OF THE DRAWINGS

The present invention will hereinafter be described in conjunction with the appended figure:

FIG. 1 is a flowsheet depicting the helium extraction process according to the present invention.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The adjective "any" means one, some, or all, indiscriminately of quantity.

The phrase "at least a portion" means "a portion or all." The at least a portion of a stream has the same composition, with the same concentration of each of the species, as the stream from which it is derived.

As used herein, "first," "second," "third," etc. are used to distinguish among a plurality of steps and/or features, and is not indicative of the total number, or relative position in time and/or space, unless expressly stated as such.

All composition values will be specified in mole percent.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

The term "dense fluid expander," abbreviated DFE, also known as a liquid expander, refers to equipment that extracts mechanical work from lowering the pressure of a dense fluid such as a liquid or a supercritical fluid, similar in function to an expander for gases. This expansion is best approximated as an isentropic process, as opposed to a valve which is best approximated as an isenthalpic process.

The term "membrane separation system" refers to one or more membrane stages in series or parallel. Each membrane stage may consist of one or more membrane modules, each module housing one or more membranes to effect a gas separation.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered.

The term "distillation column" includes fractionating columns, rectifying columns, and stripping columns. The distillation column may refer to a single column or a plurality of columns in series or parallel, where the plurality can be any combination of the above column types. Each column may comprise one or more sections of trays and/or packing.

The term "reboiling" refers to partially vaporizing a liquid present in the distillation column, typically by indirect heat exchange against a warmer process stream. This produces a vapor that facilitates mass transfer within the distillation column. The liquid may originate in the bottoms liquid or an intermediate stage in the column. The heat duty for reboiling may be transferred in the distillation column using an in situ reboiler or externally in a heat exchanger dedicated for the purpose or part of a larger heat exchanger system. The vapor-liquid separation also may take place within the distillation column or within an external flash vessel.

The term "catalytic oxidation" refers to the process by which hydrogen and/or methane is removed from a helium-containing stream. Due to the similarity in properties between hydrogen and helium, a common way to remove hydrogen is by reacting it chemically with oxygen over a catalyst such as nickel, platinum, or palladium. The oxygen can be supplied with air or a stream enriched in oxygen. After catalytic oxidation, the oxidation products, primarily water, and unreacted oxygen and/or nitrogen are removed, typically by adsorption.

"Gas bag" refers to a temporary storage container for helium-containing streams such as boil-off gas from filling room-temperature helium dewars with liquid helium. Once full, the contents of the gas bag are emptied into the helium purification process to recover the valuable helium atoms. It is typically a large, flexible material with low helium permeability.

The present apparatus and process are described with reference to FIG. 1. In this disclosure, a single reference number may be used to identify a process gas stream and the process gas transfer line that carries said process gas stream. Which feature the reference number refers to will be understood depending on the context.

For the purposes of simplicity and clarity, detailed descriptions of well-known devices, circuits, and methods are omitted so as not to obscure the description of the present invention with unnecessary detail.

The natural gas feed described in the present invention refers to a gas comprising hydrocarbons, usually originating underground in a geological formation. The natural gas is typically produced at a pressure ranging from about 1 to about 200 bar. All pressures referred to are absolute, not gauge. The pressure of the natural gas is preferably from about 10 to about 100 bar.

The methane content in natural gas typically ranges from about 50% to about 99%. All composition percentages referred to are in volume, or molar, basis, not weight basis.

The nitrogen content in natural gas typically ranges from about 1% to about 50%, or from about 10% to about 35%.

The helium content in natural gas typically ranges from about 0.01% to about 10%. Some embodiments of the present invention are directed to extracting helium from natural gas comprising from about 0.05% to about 1.0%, or from about 0.05% to about 0.2% helium.

A natural gas feed 1 comprising methane, nitrogen, and helium enters a membrane separation system 101 which can comprise one or more membrane stages in series or parallel. Helium preferentially permeates the membrane over slower species such as nitrogen and methane. Owing to the small size of the helium atom, it has a high diffusivity and therefore is expected to permeate faster than nitrogen and methane for the vast majority of membrane materials.

Sanders et al (Polymer; vol 54; pp 4729-4761; 2013) provide a convenient summary of current membrane technology. They describe the physical parameters and performance characteristics of polymeric membranes including polysulfones, cellulose acetate, aramids, polyimides, and polycarbonates. Essentially all current industrially useful gas separations are performed with polymers such as those listed above or rubbery materials such as silicone. Other membrane materials such as mixed-matrix membranes, perfluoropolymers, thermally rearranged polymers, facilitated transport membranes, metal-organic frameworks, zeolitic-imidazolate frameworks, and carbon molecular sieves, are in varying stages of development. The membrane material used in the membrane separation system 101 of the present invention can be any of those listed above, or any other material that has a faster permeation rate for some compounds such as helium and a slower permeation rate for some compounds such as methane.

The membrane is typically formed into either hollow fibers or spiral-wound flat sheets, both of which serve to provide large surface area for a relatively small volume, and housed in a module. Gas entering the module contacts the membrane, and a fraction of the gas permeates through the membrane and leaves the module in the lower-pressure permeate stream. The faster gases will be enriched in the permeate relative to the slower gases. The fraction of the gas that does not permeate through the membrane leaves the module in the non-permeate, or retentate, stream which is enriched in the slower gases relative to the faster gases.

The natural gas feed 1 may be treated prior to feeding the membrane separation system 101 if there are any compounds present that would impair the operation of the membrane—for example heavy hydrocarbons (hexanes and heavier alkanes) and/or aromatics like benzene, toluene and xylene (collectively known as BTX). Pretreatment is typically performed by adsorption, absorption, or partial condensation.

A helium-depleted non-permeate stream 2 is returned to form the bulk of the helium-depleted natural gas product, which can be fed to a pipeline, combusted for its heating value, or otherwise utilized. A helium-enriched permeate stream 3 may be mixed with a helium-depleted waste stream 4 recycled back from the downstream purification process, and produces a stream 5 which is fed to a permeate compressor 102 to produce compressed permeate stream 6.

The compressed permeate stream 6 enters acid gas removal unit 103 if needed for removal of gases such as $CO_2$, $H_2S$ and COS that would freeze in the downstream cryogenic units. The acid gases removed in stream 7 can be vented to the atmosphere or sent to sulfur removal as needed. There are several options for acid gas removal, including pressure swing adsorption, vacuum swing adsorption, or physical solvents, which in the examples presented herein is assumed to be an amine absorber regenerated with steam.

The treated stream 8 now contains an acceptably low level of acid gases, typically at a specification of less than about 100 ppmv. If an amine absorber is used, stream 8 will be saturated in water vapor that would solidify in the downstream cryogenic process. Stream 8 would therefore enter a dehydration unit 104 which preferably comprises a temperature swing adsorber (TSA) and a mercury guard bed comprising activated carbon, both well-known in the art for water and mercury removal, respectively. The water and acid gases in the spent regen gas stream 9 can be vented to the atmosphere or returned to the process depending on the source of the regen gas, which will be discussed in more detail later. Specifications for the dehydrated stream 10 are set to prevent the formation of a solid phase in the cryogenic process; for example the water specification is often about 1 ppmv. When vapor-phase mercury is present in the feed stream, a mercury guard bed is required with the TSA to prevent the vapor-phase mercury from attacking the aluminum in the downstream heat exchangers.

The dehydrated stream 10 has a low enough concentration of any compounds that could potentially freeze in the downstream processes that the risk of forming a solid phase that blocks flow is eliminated. Stream 10 can thus enter the first heat exchanger 105 to be cooled and at least partially condensed. The heat exchanger is typically a brazed aluminium plate-fin heat exchanger, common to the cryogenic industry, and can be configured as one or more heat exchangers in series or parallel. The stream is cooled in the heat exchanger against streams returning from the cryogenic distillation section, at least partially condensed, and exits the heat exchanger as cooled permeate stream 11. If pressure reduction is required, it is shown in FIG. 1 as occurring in valve 106, but can also be achieved by a dense fluid expander.

The first column feed stream 12 then enters distillation column 107, preferably at the top stage. The first distillation column 107 separates the helium from the column feed stream, which leaves the top of the column as helium-enriched overhead vapor 13. The first distillation column 107 also enriches stream 13 in nitrogen relative to methane, which will improve the downstream separation process.

The reboiler for the first distillation column 107 is shown in FIG. 1 as an external reboiler. In this configuration liquid stream 14 leaves the bottom of the column and then is heated indirectly by the dehydrated stream 10 in the first heat exchanger 105. The partially vaporized stream 15 is then separated in a first reboiler separator 108. The first distillation column 107, the first reboiler separator 108, and the portion of first heat exchanger 105 used for transferring heat to stream 14 compose the first distillation column system. Vapor stream 16 is returned to the first distillation column and a first helium-depleted bottoms liquid exits the first distillation column system as stream 17.

There are other possible configurations for the reboiler in the first distillation column system. The reboiler can also be internal to the column, or the external reboiler can be a separate heat exchanger rather than integrated into a multiple-stream heat exchanger with other hot and cold streams as shown as 105 in FIG. 1. The reboiler provides vapor feed to the bottom of the column by boiling part of the liquid leaving the bottom of the column as stream 14. As known in the art, this can be done in several ways. A reboiler, such as a thermosyphon reboiler, could sit in the liquid sump to boil liquid within the sump. In that case a stream with a temperature between that of streams 10 and 11 would be fed to the reboiler to provide the required heat and the liquid stream leaving the column sump would have the same conditions as stream 17 in FIG. 1. The first distillation column system can employ one of the reboiler configurations described above or any other known reboiler.

It is desirable to have stream 10 enter the first heat exchanger 105 at higher pressure than stream 14 enters. This makes stream 10 condense at a higher temperature than stream 14 boils, which optimizes the efficiency of heat transfer in the first heat exchanger. This pressure difference can be achieved with the pressure reduction in valve 106.

One advantage offered by permeate compressor 102 is that the pressure of stream 10 entering the first heat exchanger can be optimized. Typically in a helium extraction process, the pressure of the equivalent stream is fixed, determined by the pressure of the well head or the pipeline, for example. In the present invention, the pressures of stream 10 and stream 14 can be optimized for the most efficient heat exchange between the two, subject to constraints such as the parameter or parameters that ensure a good separation in the first distillation column. The parameter for achieving good separation may be the ratio of liquid phase density to vapor phase density, where the desired ratio is greater than 4, or greater than 6, or greater than 8. The parameter may also be the liquid phase surface tension, where the desired value is greater than 0.5 dyne/cm, or greater than 1 dyne/cm, or greater than 2 dyne/cm. The use of a membrane to concentrate the helium in the permeate stream improves the operability of the downstream cryogenic process by lowering the ratio of liquid to vapor flow rates and increasing surface tension, both of which improve the separation in distillation columns for trace helium recovery.

Helium-enriched overhead vapor 13 from the first distillation column has had a substantial amount of methane removed, increasing the fraction of helium and nitrogen compared to the first column feed stream 12. The overhead is further cooled in the second heat exchanger 109 and partially condensed. The resulting cooled overhead stream 18 is fed to a second distillation column 110, preferably at the top stage.

The second distillation column separates the helium from the cooled overhead stream, which leaves the top of the column as crude helium vapor 19. Just as seen with the first distillation column, the second distillation column also requires a reboiler, which is shown in FIG. 1 as an external reboiler. In this configuration liquid stream 20 leaves the bottom of the column and then is heated indirectly by the helium-enriched overhead vapor 13 in the second heat exchanger 109. The partially vaporized stream 21 is then separated in a second reboiler separator 111. The second distillation column 110, the second reboiler separator 111, and the portion of heat exchanger 109 used for transferring heat to stream 20 compose the second distillation column system. Vapor stream 22 is returned to the second distillation column and a second helium-depleted bottoms liquid exits the second distillation column system as stream 23.

The second distillation column system is shown in FIG. 1 with an external reboiler arrangement, where 111 is the second reboiler separator. The reboiler can also be internal to the column, or the external reboiler can be a separate heat exchanger rather than integrated into a multiple-stream heat exchanger with other hot and cold streams as shown as 109 in FIG. 1. The reboiler provides vapor feed to the bottom of the column by boiling part of the liquid leaving the bottom of the column as stream 20. As known in the art, this can be done in several ways. A reboiler, such as a thermosyphon reboiler, could sit in the liquid sump to boil liquid within the sump. In that case a stream with a temperature between that of streams 13 and 18 would be fed to the reboiler to provide the required heat and the liquid stream leaving the column sump would have the same conditions as stream 23 in FIG. 1. The second distillation column system can employ one of the reboiler configurations described above or any other known reboiler.

The second helium-depleted bottoms liquid 23 is then split into at least two portions. A first portion, stream 24, is expanded in a valve or dense fluid expander 112, reducing its temperature to form a low-temperature refrigerant stream 25. The low-temperature refrigerant stream is then used to provide refrigeration to second heat exchanger 109 to form stream 26, then warmed further in first heat exchanger 105 to form stream 27 and recompressed in return compressor 113 to form stream 28. Stream 28 is then mixed with the helium-depleted non-permeate stream 2 to form a helium-depleted natural gas product stream 29.

The temperature of stream 25 is lower than would be obtained if a more methane-rich stream such as stream 17 were expanded, as is typical of the prior art. The nitrogen enrichment in the overhead of the first distillation column system thus enables the feed to the second distillation column system to reach a lower temperature. The lower temperature in the second distillation column system allows a higher helium purity to be achieved in the crude helium vapor stream 19. The higher helium purity of stream 19 in turn reduces the size of the downstream helium purification system.

A second portion of stream 23 may be split off as stream 30, which may not be expanded to save overall power consumption. Stream 30 is warmed in the second heat exchanger 109, and the resulting first return stream 31 can be mixed with the first helium-depleted bottoms liquid 17 to form second return stream 32. The second return stream is further warmed in the first heat exchanger 105, and the resulting stream 33 is compressed in the return compressor 113. Operating the second distillation column at the same pressure as the first distillation column reduces the overall power consumption of the process because streams 19 and 30 remain at the same pressure as the feed to the first distillation column 12, reducing recompression demand. This design feature results in part from the lack of a vent stream in the process, requiring all process streams to be recompressed to feed pressure.

The embodiment depicted in FIG. 1 is one of many possible configurations for the return streams. Another configuration would be to have stream 31, rather than mixing with stream 17, pass separately through first heat exchanger 105 and mix with stream 33 before the return compressor or into the same stage of compression as stream 33 enters. Alternatively, stream 30 could be expanded to a lower pressure before entering second heat exchanger 109, pass separately through first heat exchanger 105, and enter the return compressor at an earlier stage than stream 33 enters. In a third configuration, stream 30 could be pumped to a higher pressure, warmed in second and first heat exchangers, and either enter the return compressor at a later stage than stream 33 enters or bypass the return compressor entirely.

Similarly, rather than being combined with stream 31, stream 17 could be expanded to a lower pressure before entering first heat exchanger 105 and enter the return compressor at an earlier stage than stream 33 enters. Alternatively, rather than being combined with stream 31, stream 17 could be pumped to a higher pressure, warmed in the first heat exchanger 105, and either enter the return compressor at a later stage than stream 33 enters or bypass the return compressor entirely. Furthermore, stream 17 and/or stream 23 could be split into multiple streams that could be reduced in pressure to provide more refrigeration and/or pumped to a higher pressure to minimize overall power. Introducing more pressure levels adds capital cost and complexity but can reduce power and thus operating cost if there is an appropriate stage within return compressor 113 to introduce the warmed stream. In this case, "appropriate stage" means one in which the pressure is at or just below the pressure of the stream as it leaves first heat exchanger 105.

Return compressor 113 can be a single compressor with one or more stages, with or without intercoolers between stages, or a plurality of compressors in series or parallel. If the return compressor is a single machine, stream 33 is at a higher pressure than stream 27 and so can be fed to an interstage of the return compressor. In a series arrangement, stream 27 could enter the first of the compressors and stream 33 could enter a compressor further along the series. In a parallel arrangement, separate compressors could compress streams 27 and 33 to the desired final discharge pressure.

The crude helium vapor stream 19 is warmed in the second heat exchanger 109 to form stream 34, then further warmed in the first heat exchanger 105 to form stream 35. If hydrogen is present in stream 35 above the desired product specification, the hydrogen can be removed in catalytic oxidizer 115, where hydrogen reacts with oxygen added via stream 36 in the form of air or a stream enriched in oxygen. The resulting stream 37 would then enter adsorption system 116 to remove water generated from catalytic oxidation of hydrogen as well as any residual impurities such as oxygen, nitrogen, or methane. The pure helium product 38 can then be liquefied or sold as a compressed gas. Alternatives to the adsorption system to make a pure helium product include cryogenic distillation or partial condensation. The tail gas stream 4 from adsorption system 116 contains a significant amount of helium at low pressure, so is recycled to the permeate compressor 102.

Although not shown in FIG. 1, any of the helium-depleted streams from the process may be used to regenerate the TSA in dehydration unit 104. Regeneration requires both heat, which can be provided by electrical heaters or process steam, and a process stream to carry the impurities out of the TSA, such as nitrogen from an external supply or a portion of a helium-depleted stream from the helium extraction process. Depending on the pressure required to regenerate the TSA, that stream may be at a low pressure like stream 4 or stream 27, at an intermediate pressure like stream 33, or at a high pressure like stream 2, stream 28, or stream 29. If stream 4 is used as regen gas, the impurity-laden spent regen gas can be returned to permeate compressor 102. If streams 2, 27, 28, 29, or 33 are used as regen gas, the impurity-laden spent regen gas can then be recombined with the the remainder of the helium-depleted streams either before or after recompression in compressor 113. If nitrogen is used to regenerate the TSA, the impurity-laden spent regen gas may be vented to the atmosphere or sent to further treatment to remove the hydrocarbons as determined by air pollution regulations.

Alternate embodiments of the helium purification process are well known in the art. Most common are processes that cool a crude helium stream to cryogenic temperatures, partially condensing the feed stream so that most of the nitrogen and virtually all the methane condenses, leaving a vapor stream with a composition of about 50 to 90% helium. This vapor stream is warmed and then the hydrogen is removed in the same manner described in FIG. 1. The liquid stream leaving the partial condensation process is dropped in pressure to recover helium by flashing and withdrawing a vapor stream. The vapor stream is warmed, recompressed, and combined with the crude helium stream entering the purifier. In the present invention, both the vapor stream and the compressor are absent. Having decreased the pressure of the liquid stream, the resulting lower-temperature liquid stream provides refrigeration to the partial condensation process. This small stream leaves the helium purification process and can be recompressed into the sales gas stream or vented to atmosphere after passing through a catalytic oxidation process to remove the methane if needed. The tail gas from the helium PSA is dried by a TSA to remove the water produced by the catalytic oxidation of hydrogen with air or a stream enriched in oxygen, then is recompressed and mixed the crude helium stream as it enters the purifier. Also recycled to the feed to the purifier is the helium collected in the "gas bag", to minimize the overall losses of helium from the process. In the present invention, both the tail gas and the flow from the gas bag are fed to the permeate compressor which eliminates the need for a separate compressor located in a conventional helium purifier process.

Blackwell and Kalman (U.S. Pat. No. 3,599,438) describe helium purification in more detail, including the steps of hydrogen removal by catalytic oxidation, dehydration by adsorption, and helium enrichment by partial condensation. Blackwell and Kalman also show the recycle of the intermediate pressure helium stream (16).

Kirk-Othmer Encyclopedia of Chemical Technology, "Cryogenic technology," (2012) also describes alternative helium purification arrangements. For example, FIG. 13 in that chapter shows a process with a single pressure flash in the helium cold end that causes a higher helium loss due to helium dissolved in the liquid stream leaving the system. FIG. 14 in the same chapter shows a different order of operations: partial condensation first, followed by catalytic oxidation and final purification by PSA, where the PSA tail gas is recompressed, dehydrated, and recycled to the partial condensation step.

Gottier and Herron (U.S. Pat. No. 5,017,204) describe a helium purification cycle employing a dephlegmator that combines heat transfer and mass transfer steps into a single heat exchanger. Any of these purification methods, or similar purification methods, may be employed to generate a pure helium product from a crude helium stream.

Compared with helium purification as shown in the prior art, the present invention combines helium extraction and purification in a way that provides an advantage in efficiency and simplicity. Stream 35 is at a high enough helium purity to eliminate both the partial condensation steps and the compression power required to provide the necessary refrigeration in a conventional helium purifier. A further advantage is that the permeate compressor can accept streams such as the tail gas stream 4. Compared with a process that has separate extraction and purification sections, the present invention requires fewer instances of compression. The permeate compressor also presents a convenient recycle point for a gas bag, the most common way that helium is recovered from downstream process streams that would otherwise be vented to the atmosphere.

Certain embodiments and features of the invention have been described using a set of numerical upper limits and a set of numerical lower limits. For the sake of brevity, only certain ranges are explicitly disclosed herein. However, it should be appreciated that ranges from any lower limit to any upper limit are contemplated unless otherwise indicated. Similarly, ranges from any lower limit may be combined with any other lower limit to recite a range not explicitly recited, and ranges from any upper limit may be combined with any other upper limit to recite a range not explicitly recited. Further, a range includes every point or individual value between its end points even though not explicitly recited. Thus, every point or individual value may serve as its own lower or upper limit combined with any other point or individual value or any other lower or upper limit, to recite a range not explicitly recited. All numerical values are "about" or "approximately" the indicated value, and take into account experimental error and variations that would be expected by a person having ordinary skill in the art.

Aspects of the present invention include:

1: A process for recovering helium from a natural gas feed comprising methane, nitrogen, and helium, said process comprising:

introducing said natural gas feed to a membrane separation system to produce a helium-enriched permeate stream and a helium-depleted non-permeate stream;

compressing said helium-enriched permeate stream in a permeate compressor to produce a compressed permeate stream;

cooling said compressed permeate stream, or a stream derived from said compressed permeate stream, to produce a cooled permeate stream which is at least partially condensed;

separating said cooled permeate stream in a first distillation column system to produce a helium-enriched overhead vapor and a first helium-depleted bottoms liquid;

cooling said helium-enriched overhead vapor to produce a cooled overhead stream which is at least partially condensed;

separating said cooled overhead stream in a second distillation column system to produce a crude helium vapor and a second helium-depleted bottoms liquid;

and expanding at least a portion of the second helium depleted bottoms liquid to produce a low-temperature refrigerant;

wherein the cooling duty for cooling the helium-enriched overhead vapor is provided at least in part by indirect heat exchange with said low-temperature refrigerant.

2: A process according to #1 wherein the pressure of said cooled permeate is set to achieve a ratio of liquid to vapor density in the distillation column system greater than 4.

3: A process according to any of #1 to #2 wherein the pressure of said cooled permeate is set to achieve a liquid phase surface tension in the distillation column system greater than 0.5 dyne/cm.

4: A process according to any of #1 to #3 further comprising the step of removing at least one of carbon dioxide, water, and heavy hydrocarbons from said compressed permeate stream.

5: A process according to any of #1 to #4 wherein the re-boiling duty for said first distillation column system is provided at least in part by indirect heat exchange with the compressed permeate stream.

6: A process according to any of #1 to #5 wherein the re-boiling duty for said second distillation column system is provided at least in part by indirect heat exchange with the helium-enriched overhead vapor.

7: A process according to any of #1 to #6 further comprising the steps of warming at least a portion of said second helium-depleted bottoms liquid to produce a first return stream;

combining said first return stream with said first helium-depleted bottoms liquid to produce a second return stream;

and compressing and combining said second return stream with said low-temperature refrigerant and said helium-depleted non-permeate stream to produce a helium-depleted natural gas product.

8: A process according to #7 wherein the cooling duty for cooling the compressed permeate stream is provided at least in part by indirect heat exchange with said second return stream.

9: A process according to any of #1 to #8 further comprising the step of purifying the crude helium vapor to produce a pure helium product and a helium-depleted waste stream.

10: A process according to #9 further comprising combining said helium-depleted waste stream with said helium-enriched permeate stream prior to entering, or at an interstage of, said permeate compressor.

11: A process according to any of #9 to #10 wherein the crude helium vapor is purified in an adsorption system.

12: A natural gas processing plant for recovering helium from pressurized natural gas comprising methane, nitrogen, and helium, said plant comprising:

a membrane separation system comprising a plurality of membrane stages connected in parallel or series;

a permeate compressor;

a first conduit system for transferring a helium-enriched permeate stream from said membrane separation system to said permeate compressor;

a first distillation column system comprising a helium-enriched overhead vapor section and a helium-depleted bottoms section;

a second conduit for transferring a compressed permeate stream from said permeate compressor to said first distillation column system;

wherein the second conduit system comprises a heat exchange system;

a second distillation column system comprising a helium-enriched overhead vapor section and a helium-depleted bottoms section;

a third conduit for transferring a helium-enriched overhead vapor from said overhead section of said first distillation column system to said second distillation column system;

wherein the third conduit system comprises a heat exchange system;

a fourth conduit for transferring a second helium-depleted bottoms liquid from said helium-depleted bottoms section of said second distillation column to said second heat exchange system;

wherein said fourth conduit comprises a pressure reduction device and a heat exchange system.

13: A natural gas processing plant according to #12 wherein the second conduit comprises a pressure reduction device.

14: A natural gas processing plant according to any of #12 to #13 wherein the second conduit comprises a pretreatment section comprising at least one unit selected from the group consisting of a dehydration unit, a $CO_2$ removal unit, and an $H_2S$ removal unit.

15: A natural gas processing plant according to any of #12 to #14 further comprising: a combining device;

wherein said fourth conduit is connected to said combining device;

a fifth conduit for transferring a helium depleted bottoms liquid from said helium-depleted bottoms section of said first distillation column to said combining device.

a return compressor;

and a sixth conduit for transferring a second return stream from said combining device to said return compressor.

EXAMPLE 1

A computer simulation of the process of FIG. 1 was carried out in Aspen Plus, a commercially available process simulation software package. The feed stream of natural gas contains 10% nitrogen and 0.065% helium. Key stream parameters such as composition, pressure, temperature, and flow rate, are shown in Table 1, along with total power consumption.

Helium recovery of the overall process is 80.0%. The recovery of the cryogenic part of the process is 99.5% with recovery over the membrane of around 80.4%. A cryogenic process would be able to achieve around 99.5% overall recovery but would be significantly larger. Using the membrane module, flow to the cryogenic process is reduced to 6.4% of what it would otherwise have been, increasing feed helium from 650 ppm to 1.2%. $CO_2$ passes through the membrane faster than methane, so the concentration of $CO_2$ in stream 3 is higher than in stream 1, but the molar flow rate of $CO_2$ is only 43% that of the feed, meaning a signifantly lower capital and operating cost to remove $CO_2$. Water removal on a stream 6.4% of the feed flow is a huge reduction in cost.

At high flowrates, the reduction in molar flow rate from stream 1 to stream 3 will mean reducing several large trains of columns in parallel to one small diameter column, greatly reducing the cost of the cryogenic section. The savings in pretreatment and cryogenic sections must be balanced against the extra cost of the membranes and reduced helium recovery, but for feeds with high flow rates and low enough levels of BTX to not require membrane pretreatment, the present invention offers significant savings over exclusively cryogenic methods.

TABLE 1

| Component | Composition | Stream 1 | 3 | 4 | 10 | 11 | 13 | 17 | 18 |
|---|---|---|---|---|---|---|---|---|---|
| HE | mol % | 0.065 | 0.643 | 34.869 | 1.223 | 1.223 | 6.602 | 0.003 | 6.602 |
| N2 | mol % | 10.03 | 11.54 | 60.36 | 16.02 | 16.02 | 38.88 | 10.84 | 38.88 |
| CD | mol % | 4.01 | 21.29 | 0.01 | 0.00 | 0.00 | 0.00 | 0.00 | 0.00 |
| C1 | mol % | 85.29 | 61.92 | 3.18 | 82.63 | 82.63 | 53.89 | 89.14 | 53.89 |
| C2 | mol % | 0.10 | 0.00 | 0.00 | 0.00 | 0.00 | 0.00 | 0.00 | 0.00 |
| C3 | mol % | 0.01 | 0.00 | 0.00 | 0.00 | 0.00 | 0.00 | 0.00 | 0.00 |
| H2O | mol % | 0.47 | 4.50 | 1.34 | 0.00 | 0.00 | 0.00 | 0.00 | 0.00 |
| H2 | mol % | 0.01 | 0.09 | 0.00 | 0.12 | 0.12 | 0.62 | 0.01 | 0.62 |
| Temperature | ° C. | 67.2 | 59.7 | 51.1 | 55.0 | −119.9 | −123.3 | −119.6 | −172.0 |
| Pressure | bar (abs) | 39.3 | 1.5 | 1.6 | 25.8 | 25.5 | 20.5 | 20.5 | 20.3 |
| Flowrate (total) | kmol/hr | 22679.6 | 1850.7 | 14.5 | 1387.3 | 1387.3 | 256.4 | 1131.0 | 256.4 |

| Component | Composition | Stream 19 | 25 | 30 | 32 | 2 | 29 | 38 |
|---|---|---|---|---|---|---|---|---|
| HE | mol % | 67.885 | 0.009 | 0.009 | 0.004 | 0.014 | 0.013 | 99.992 |
| N2 | mol % | 24.51 | 40.43 | 40.43 | 12.51 | 9.90 | 10.27 | 0.01 |
| CD | mol % | 0.00 | 0.00 | 0.00 | 0.00 | 2.48 | 2.33 | 0.00 |
| C1 | mol % | 1.86 | 59.49 | 59.49 | 87.48 | 87.37 | 87.17 | 0.00 |
| C2 | mol % | 0.00 | 0.00 | 0.00 | 0.00 | 0.11 | 0.10 | 0.00 |
| C3 | mol % | 0.00 | 0.00 | 0.00 | 0.00 | 0.01 | 0.01 | 0.00 |
| H2O | mol % | 0.00 | 0.00 | 0.00 | 0.00 | 0.11 | 0.10 | 0.00 |
| H2 | mol % | 5.75 | 0.07 | 0.07 | 0.01 | 0.00 | 0.00 | 0.00 |
| Temperature | ° C. | −171.0 | −173.7 | −141.1 | −120.4 | 58.7 | 58.9 | 51.1 |
| Pressure | bar (abs) | 20.3 | 1.9 | 20.3 | 20.2 | 39.0 | 39.0 | 18.6 |
| Flowrate (total) | kmol/hr | 24.9 | 164.1 | 67.4 | 1198.4 | 20828.9 | 22191.3 | 11.8 |
| Permiate Compressor | | 6.7 | MW | | | | | |
| Compressor 113 Power | | 2.4 | MW | | | | | |
| Total Net Power | | 9.0 | MW | | | | | |

EXAMPLE 2

A computer simulation of the process of FIG. 1 was carried out in Aspen Plus, a commercially available process simulation software package. The feed stream of natural gas contains 35% nitrogen and 0.14% helium. Key stream parameters such as composition, pressure, temperature, and flow rate, are shown in Table 2, along with total power consumption.

Helium recovery of the overall process is 80.0%. The recovery of the cryogenic part of the process is 99.5% with recovery over the membrane of around 80.4%. A cryogenic process would be able to achieve around 99.5% overall recovery but would be significantly larger. Using the membrane module, flow to the cryogenic process is reduced to 6.9% of what it would otherwise have been, increasing feed helium from 0.14% to 2.32%. $CO_2$ passes through the membrane faster than methane, so the concentration of $CO_2$ in stream 3 is higher than in stream 1, but the molar flow rate of $CO_2$ is only 43% that of the feed, meaning a signifantly lower capital and operating cost to remove $CO_2$. Water removal on a stream 6.9% of the feed flow is a huge reduction in cost.

TABLE 2

| Component | Composition | Stream 1 | Stream 3 | Stream 4 | Stream 10 | Stream 11 | Stream 13 | Stream 17 | Stream 18 |
|---|---|---|---|---|---|---|---|---|---|
| HE | mol % | 0.140 | 1.263 | 43.178 | 2.320 | 2.320 | 3.479 | 0.001 | 3.479 |
| N2 | mol % | 35.09 | 35.94 | 53.80 | 47.16 | 47.16 | 60.12 | 21.19 | 60.12 |
| CD | mol % | 4.01 | 19.42 | 0.01 | 0.00 | 0.00 | 0.00 | 0.00 | 0.00 |
| C1 | mol % | 60.16 | 39.12 | 1.48 | 50.41 | 50.41 | 36.24 | 78.81 | 36.24 |
| C2 | mol % | 0.10 | 0.00 | 0.00 | 0.00 | 0.00 | 0.00 | 0.00 | 0.00 |
| C3 | mol % | 0.01 | 0.00 | 0.00 | 0.00 | 0.00 | 0.00 | 0.00 | 0.00 |
| H2O | mol % | 0.47 | 4.16 | 1.39 | 0.00 | 0.00 | 0.00 | 0.00 | 0.00 |
| H2 | mol % | 0.01 | 0.08 | 0.00 | 0.11 | 0.11 | 0.16 | 0.00 | 0.16 |
| Temperature | ° C. | 67.2 | 59.7 | 51.1 | 55.0 | −126.9 | −130.4 | −127.3 | −180.4 |
| Pressure | bar (abs) | 39.3 | 1.5 | 1.6 | 26.3 | 26.0 | 21.6 | 21.6 | 21.5 |
| Flowrate (total) | kmol/hr | 22679.6 | 2026.5 | 25.3 | 1573.4 | 1573.4 | 1049.4 | 524.0 | 1049.4 |

| Component | Composition | Stream 19 | Stream 25 | Stream 30 | Stream 32 | Stream 2 | Stream 29 | Stream 38 |
|---|---|---|---|---|---|---|---|---|
| HE | mol % | 74.070 | 0.012 | 0.012 | 0.006 | 0.030 | 0.029 | 99.994 |
| N2 | mol % | 22.29 | 61.98 | 61.98 | 41.08 | 35.01 | 35.90 | 0.01 |
| CD | mol % | 0.00 | 0.00 | 0.00 | 0.00 | 2.50 | 2.33 | 0.00 |
| C1 | mol % | 0.76 | 37.98 | 37.98 | 58.90 | 62.23 | 61.52 | 0.00 |
| C2 | mol % | 0.00 | 0.00 | 0.00 | 0.00 | 0.11 | 0.10 | 0.00 |
| C3 | mol % | 0.00 | 0.00 | 0.00 | 0.00 | 0.01 | 0.01 | 0.00 |
| H2O | mol % | 0.00 | 0.00 | 0.00 | 0.00 | 0.11 | 0.10 | 0.00 |
| H2 | mol % | 2.88 | 0.03 | 0.03 | 0.02 | 0.00 | 0.00 | 0.00 |
| Temperature | ° C. | −176.5 | −182.6 | −146.8 | −130.2 | 58.7 | 59.0 | 51.1 |
| Pressure | bar (abs) | 21.5 | 1.9 | 21.5 | 21.4 | 39.0 | 39.0 | 19.7 |
| Flowrate (total) | kmol/hr | 49.1 | 501.7 | 498.6 | 1022.6 | 20653.2 | 22177.4 | 25.5 |
| Permeate Compressor | | | 7.5 | MW | | | | |
| Compressor 113 Power | | | 3.6 | MW | | | | |
| Total Net Power | | | 11.0 | MW | | | | |

While the principles of the invention have been described above in connection with preferred embodiments, it is to be clearly understood that this description is made only by way of example and not as a limitation of the scope of the invention.

We claim:

1. A process for recovering helium from a natural gas feed comprising methane, nitrogen, and helium, said process comprising:
    introducing said natural gas feed to a membrane separation system to produce a helium-enriched permeate stream and a helium-depleted non-permeate stream;
    compressing said helium-enriched permeate stream in a permeate compressor to produce a compressed permeate stream;
    cooling said compressed permeate stream, or a stream derived from said compressed permeate stream, to produce a cooled permeate stream which is at least partially condensed;
    separating said cooled permeate stream in a first distillation column system to produce a helium-enriched overhead vapor and a first helium-depleted bottoms liquid;
    cooling said helium-enriched overhead vapor to produce a cooled overhead stream which is at least partially condensed;
    separating said cooled overhead stream in a second distillation column system to produce a crude helium vapor and a second helium-depleted bottoms liquid;
    and expanding at least a portion of the second helium depleted bottoms liquid to produce a low-temperature refrigerant;
    wherein the cooling duty for cooling the helium-enriched overhead vapor is provided at least in part by indirect heat exchange with said low-temperature refrigerant;
    warming at least a portion of said second helium-depleted bottoms liquid to produce a first return stream;
    combining said first return stream with said first helium-depleted bottoms liquid to produce a second return stream;
    and compressing and combining said second return stream with said low-temperature refrigerant and said helium-depleted non-permeate stream to produce a helium-depleted natural gas product.

2. Process of claim 1 wherein the pressure of said first distillation column is set to achieve a ratio of liquid to vapor density in the distillation column system greater than.

3. Process of claim 1 wherein the pressure of said first distillation column is set to achieve a liquid phase surface tension in the distillation column system greater than 0.5 dyne/cm.

4. Process of claim 1 further comprising the step of removing at least one of carbon dioxide, water, and heavy hydrocarbons from said compressed permeate stream.

5. Process of claim 1 wherein the re-boiling duty for said first distillation column system is provided at least in part by indirect heat exchange with the compressed permeate stream.

6. Process of claim 1 wherein the re-boiling duty for said second distillation column system is provided at least in part by indirect heat exchange with the helium-enriched overhead vapor.

7. Process of claim 1 wherein the cooling duty for cooling the compressed permeate stream is provided at least in part by indirect heat exchange with said second return stream.

8. Process of claim 1 further comprising the step of purifying the crude helium vapor to produce a pure helium product and a helium-depleted waste stream.

9. Process of claim 8 further comprising combining said helium-depleted waste stream with said helium-enriched permeate stream prior to entering, or at an interstage of, said permeate compressor.

10. Process of claim 8 wherein the crude helium vapor is purified in an adsorption system.

* * * * *